United States Patent
Wang

(10) Patent No.: US 9,613,194 B2
(45) Date of Patent: Apr. 4, 2017

(54) FUNCTION CONTROL METHODS AND SYSTEMS FOR WEARABLE ELECTRONIC DEVICES

(71) Applicant: Noodoe Corporation, Taipei (TW)

(72) Inventor: John C. Wang, Taipei (TW)

(73) Assignee: NOODOE CORPORATION, Taipei (TW)

(*) Notice: Subject to any disclaimer, the term of this patent is extended or adjusted under 35 U.S.C. 154(b) by 35 days.

(21) Appl. No.: 14/728,000

(22) Filed: Jun. 2, 2015

(65) Prior Publication Data

US 2015/0371022 A1    Dec. 24, 2015

(30) Foreign Application Priority Data

Jun. 18, 2014  (TW) .............................. 103120967 A

(51) Int. Cl.
G06F 21/31    (2013.01)
G06F 1/16     (2006.01)
G06F 21/62    (2013.01)

(52) U.S. Cl.
CPC ............ *G06F 21/31* (2013.01); *G06F 1/1675* (2013.01); *G06F 1/1677* (2013.01); *G06F 1/1679* (2013.01); *G06F 1/1681* (2013.01); *G06F 21/629* (2013.01)

(58) Field of Classification Search
CPC .... G06F 9/30189; G06F 1/1677; G06F 21/31; G06F 21/629; G06F 1/1616; G06F 1/162; G06F 1/1684; G06F 1/1686; G06F 1/1675; G06F 1/1679; G06F 1/1681; G07C 2209/65; G07C 2209/64; G07C 2209/62; G04B 47/063

See application file for complete search history.

(56) References Cited

U.S. PATENT DOCUMENTS

| | | | |
|---|---|---|---|
| 6,703,918 B1 | 3/2004 | Kita | |
| 2003/0040346 A1* | 2/2003 | Fukuda | G06F 1/1616 455/575.1 |
| 2004/0064698 A1* | 4/2004 | Zhang | G06F 21/34 713/169 |
| 2005/0083642 A1* | 4/2005 | Senpuku | G06F 1/1616 361/679.21 |
| 2015/0074615 A1* | 3/2015 | Han | G06K 9/00033 715/863 |
| 2015/0277384 A1* | 10/2015 | Mankowski | G04G 21/04 368/10 |

FOREIGN PATENT DOCUMENTS

| | | |
|---|---|---|
| TW | 200517935 A | 6/2005 |
| TW | 201222321 A | 6/2012 |
| TW | M470036 U | 1/2014 |

* cited by examiner

*Primary Examiner* — Dionne H Pendleton
(74) *Attorney, Agent, or Firm* — McClure, Qualey & Rodack, LLP

(57) ABSTRACT

Function control methods and systems for wearable electronic devices are provided. First, a flag having a specific initial value is provided in a wearable electronic device. Then, an operational state of the wearable electronic device is obtained. When the operational state is changed, the specific initial value of the flag is deleted or the flag is set to a specific value. Once the value of the flag does not match the specific initial value, at least one function of the wearable electronic device is disabled.

8 Claims, 5 Drawing Sheets

FUNCTION CONTROL METHODS AND SYSTEMS FOR WEARABLE ELECTRONIC DEVICES

BACKGROUND OF THE INVENTION

Field of the Invention

The disclosure relates generally to function control methods and systems for wearable electronic devices, and, more particularly to methods and systems that can set a flag value according to an operational state of a wearable electronic device, and determine whether at least one function of the wearable electronic device is allowed to be activated according to the flag value.

Description of the Related Art

Recently, electronic devices, such as smart phones, tablets, notebooks, or other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

On the other hand, with the coming of IOT (Internet Of Things) generation, every device or object can connect to networks, and users can access and control these devices or objects via networks. Currently, wearable electronic devices have become the most tangible applications of IOT. In some cases, the wearable device can detect health information of a user, record exercise information and sleep patterns, or display email messages or incoming calls.

Due to the capabilities and physical properties of wearable device, a user typically wears the device for a long time, and the wearable device can record related information of the user at any time. In some cases, important data, such as identification data or electronic wallet of the user may be recorded in the wearable device. When the user takes off the wearable device, the important data may be leaked if other users obtain the wearable device.

BRIEF SUMMARY OF THE INVENTION

Function control methods and systems for wearable electronic devices are provided, wherein a flag value can be set according to an operational state of a wearable electronic device, and it is determined whether at least one function of the wearable electronic device is allowed to be activated according to the flag value.

In an embodiment of a function control method for wearable electronic devices, a flag having a specific initial value is provided in a wearable electronic device. Then, an operational state of the wearable electronic device is obtained. When the operational state changes, the value of the flag is changed. If the value of the flag does not match the specific initial value, at least one function of the wearable electronic device is disabled.

An embodiment of a function control system for wearable electronic devices comprises a storage unit and a processing unit. The storage unit records an operational state of a wearable electronic device, and a flag having a specific initial value is provided in a wearable electronic device. When the operational state changes, the process unit changes the value of the flag, wherein if the value of the flag does not match the specific initial value, at least one function of the wearable electronic device is disabled.

In some embodiments, the determination of whether the operational state changes is performed by determining whether a fastener of the wearable electronic device is changed from a closed state to an open state, wherein the fastener can be opened or closed to allow a user to fasten the wearable electronic device to be a loop, such that the wearable electronic device can be worn on the user.

In some embodiments, the wearable electronic device comprises a main body and a connecting component. When the main body does not connect with the connecting component, the operational state of the wearable electronic device is in a first operational state. When the main body connects with the connecting component, the operational state of the wearable electronic device is in a second operational state. The determination of whether the operational state changes is performed by determining whether the operational state of the wearable electronic device changes from the second operational state to the first operational state.

In some embodiments, it is determined whether authentication data is received. When the received authentication data matches preset data in the wearable electronic device, the value of the flag is reset to the specific initial value. In some embodiments, when the authentication data is not received or the received authentication data does not match the preset data in the wearable electronic device, the wearable electronic device is locked.

In some embodiments, the wearable electronic device comprises at least one motion sensor for detecting a motion corresponding to the wearable electronic device, wherein the authentication data comprises the motion.

In some embodiments, the function of the wearable electronic device provides specific data in the wearable electronic device to be accessed by a specific electronic device.

In some embodiments, the flag is implemented by a register.

Function control methods for wearable electronic devices may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Function control methods and systems for wearable electronic devices are provided.

Figure 1:
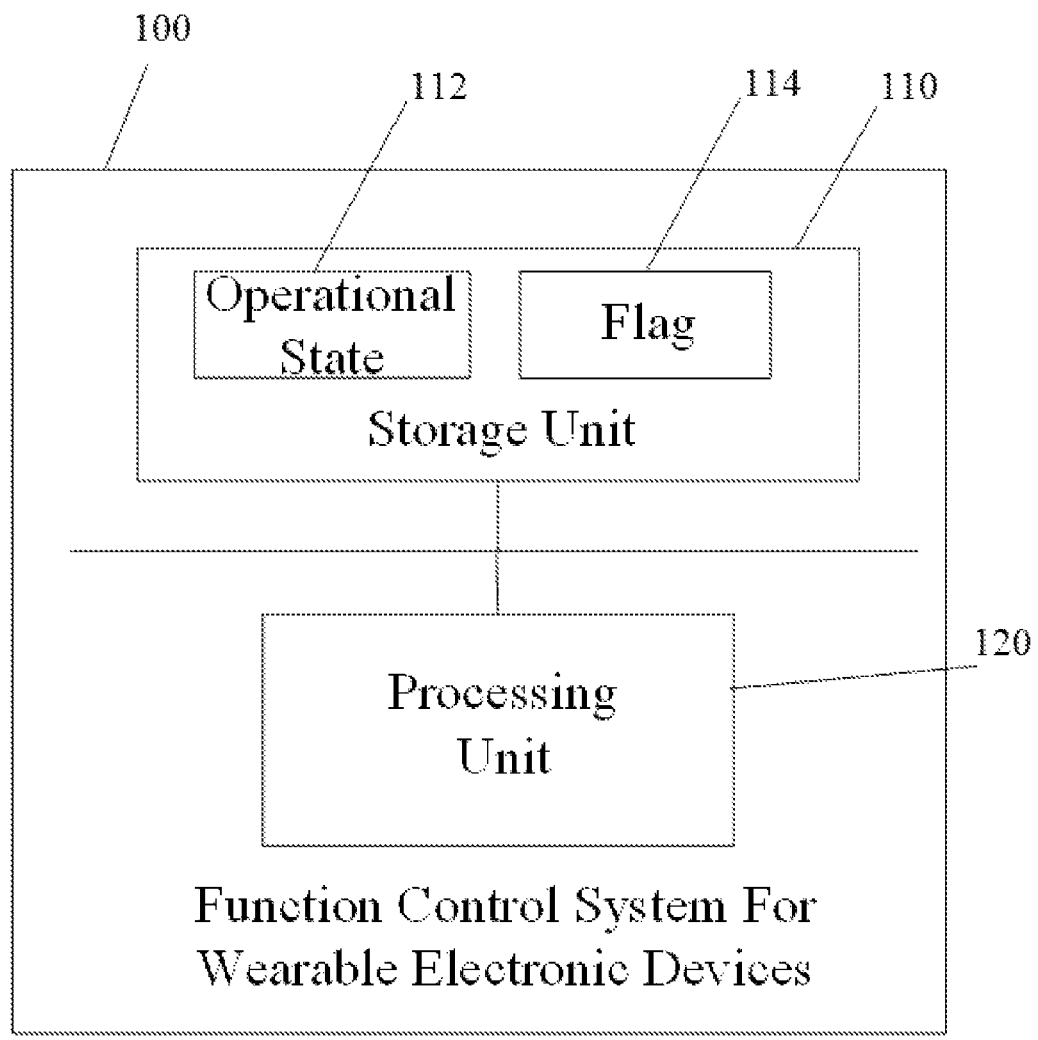
FIG. 1 is a schematic diagram illustrating an embodiment of a function control system for wearable electronic devices of the invention.

FIG. 1 is a schematic diagram illustrating an embodiment of a function control system for wearable electronic devices of the invention. The function control system for wearable electronic devices can be used in a wearable electronic device. It is noted that, the wearable electronic device can be worn on any portion of an object, such as a user or an animal.

The function control system for wearable electronic devices 100 can comprise a storage unit 110 and a processing unit 120. The storage unit 110 records an operational state 112 of the wearable electronic device. It is understood that, in some embodiments, the operational state 112 represents the wearing situation of the wearable electronic device. In some embodiments, the wearable electronic device can comprise a fastener, which can be opened or closed to allow a user to fasten the wearable electronic device to be a loop, such that the wearable electronic device can be worn on the user. In some embodiments, the wearable electronic device can comprise a main body and a connecting component. When the main body does not connect with the connecting component, the operational state of the wearable electronic device is in a first operational state, such as an open state. When the main body connects with the connecting component, the operational state of the wearable electronic device is in a second operational state, such as a closed state. It is noted that, in some embodiments, the access authorities to access the wearable electronic device in different operational states may be different. It is understood that, the access authority may be defined as a set of hardware and/or software elements of the wearable electronic device which can be accessed in a specific operational state. The storage unit 110 further records a flag 114 having a specific initial value. It is understood that, in some embodiments, the specific initial value can be applied with a hardware and/or software protection mechanism, such as an encryption process, thereby increasing the security of the specific initial value. It is understood that, in some embodiments, the flag 114 can be implemented using a hardware component, such as a register. It is noted that, the wearable electronic device may have a plurality of functions. The wearable electronic device can determine which function of the wearable electronic device can be executed according to the value of the flag 114. In some embodiments, when the value of the flag 114 is the specific initial value, all functions of the wearable electronic device can be executed. When the value of the flag 114 does not match the specific initial value, at least one of the functions of the wearable electronic device will be disabled. That is the execution and use of at least one function of the wearable electronic device is limited. The processing unit 120 can control related operations of hardware and software in the wearable electronic device, and perform the function control methods for wearable electronic devices of the invention, which will be discussed later.

Figure 2:
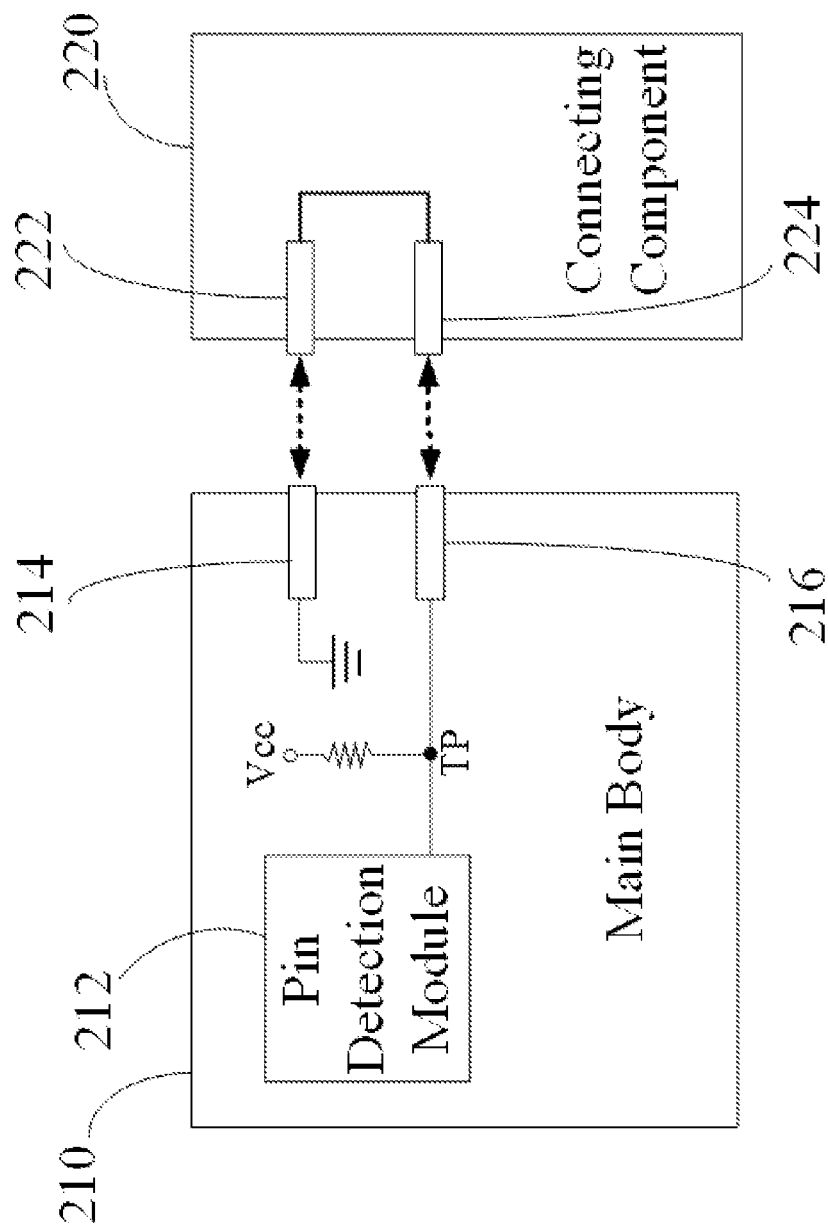
FIG. 2 is a schematic diagram illustrating an embodiment of a main body and a connecting component of the invention.

FIG. 2 is a schematic diagram illustrating an embodiment of a main body and a connecting component of the invention. As shown in FIG. 2, the main body 210 comprises a pin detection module 212, and at least two pin, such as a first pin 214 and a second pin 216. The pin detection module 212 couples to the first pin 214 or the second pin 216 to determine whether the first pin 214 and the second pin 216 conduct current, thus determining the operational state of the electronic device. It is understood that, in some embodiments, the first pin 214 and the second pin 216 may be spring loaded connectors, such as Pogo pins. The connecting component 220 can connect with the main body 210, such that the first pin 214 and the second pin 216 of the main body 210 conduct current. In the embodiment, the connecting component 220 can comprise a third pin 222 and a fourth pin 224, which are connected with each other. When the connecting component 220 and the main body 210 are connected, the third pin 222 of the connecting component 220 connects to the first pin 214 of the main body 210, and the fourth pin 224 of the connecting component 220 connects to the second pin 216 of the main body 210, such that the first pin 214 and the second pin 216 conduct current. As described, the operational state of the wearable electronic device may comprise a first operational state and a second operational state. It is noted that, in some embodiments, the first pin 214 and the second pin 216 are open when the wearable electronic device is in the first operational state. When the pin detection module 212 detects that the first pin 214 and the second pin 216 are conducted, the pin detection module 212 drives the wearable electronic device to change its operational state from the first operational state to the second operational state.

It is noted that, in the example of FIG. 2, the first pin 214 can connect to the ground, and a power Vcc can be provided to the second pin 216. The pin detection module 212 can couple to the second pin 216, and detects the electric potential corresponding to a testing point TP to determine the operational state of the wearable electronic device. In the example, when the electric potential corresponding to the testing point TP is high, that is the first pin 214 and the second pin 216 are open, the operational state of the wearable electronic device is in the first operational state. When the electric potential corresponding to the testing point TP is low, that is the first pin 214 and the second pin 216 conduct current, the operational state of the wearable electronic device is in the second operational state. It is understood that, the circuit for detecting whether the first pin 214 and the second pin 216 conduct current can be implemented according to different designs and requirements.

Figure 3:
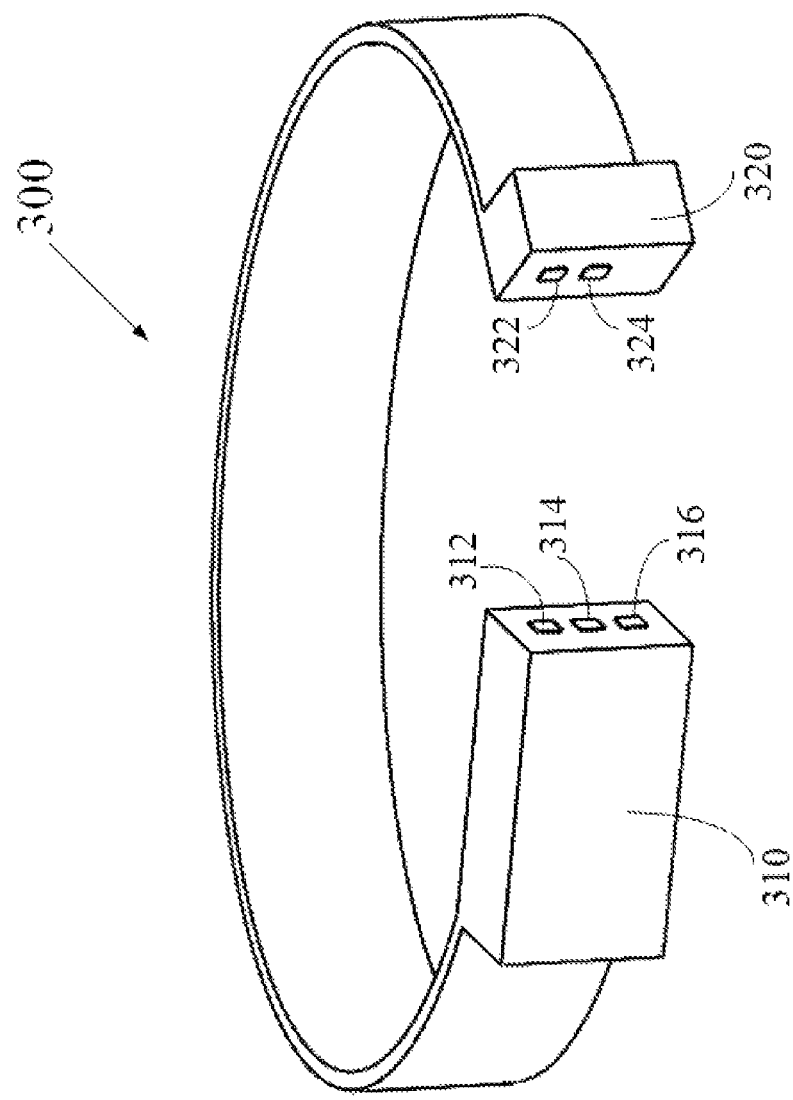
FIG. 3 is a schematic diagram illustrating an embodiment of an example of a wearable electronic device having a main body and a connecting component of the invention.

FIG. 3 is a schematic diagram illustrating an embodiment of an example of a wearable electronic device having a main body and a connecting component of the invention. As shown in FIG. 3, the wearable electronic device 300 comprises a main body 310 and a connecting component 320. The main body 310 comprises a first pin 312, a second pin 314, and a third pin 316, wherein the first pin 312 and the second pin 314 are open in the main body 310. The third pin 316 of the main body 310 can be used for charging. The connecting component 320 can comprise a first pin 322 and a second pin 324, which are connected with each other in the connecting component 320. When the user takes off the wearable electronic device 300, the first pin 312 and the second pin 314 of the wearable electronic device 30 are open, and the operational state of the wearable electronic device 300 enters the first operational state. When the user wears the wearable electronic device 300, that is the connecting component 320 and the main body 310 are connected, the first pin 322 of the connecting component 320 contacts with the first pin 312 of the main body 310, and the second pin 324 of the connecting component 320 contacts with the second pin 314 of the main body 310, such that the first pin 312 and the second pin 314 of the main body 310 conduct current, and the operational state of the wearable electronic device 300 enters the second operational state.

It is understood that, the mechanisms for detecting the operational state of the wearable electronic device in FIGS. 2 and 3 are examples of the application, and the present invention is not limited thereto. For example, a magnetic induction manner can be used for determining whether the pins conduct current. Any hardware and/or software mechanism which can determine the operational state of the wearable electronic device can be used in the present invention.

Figure 4:
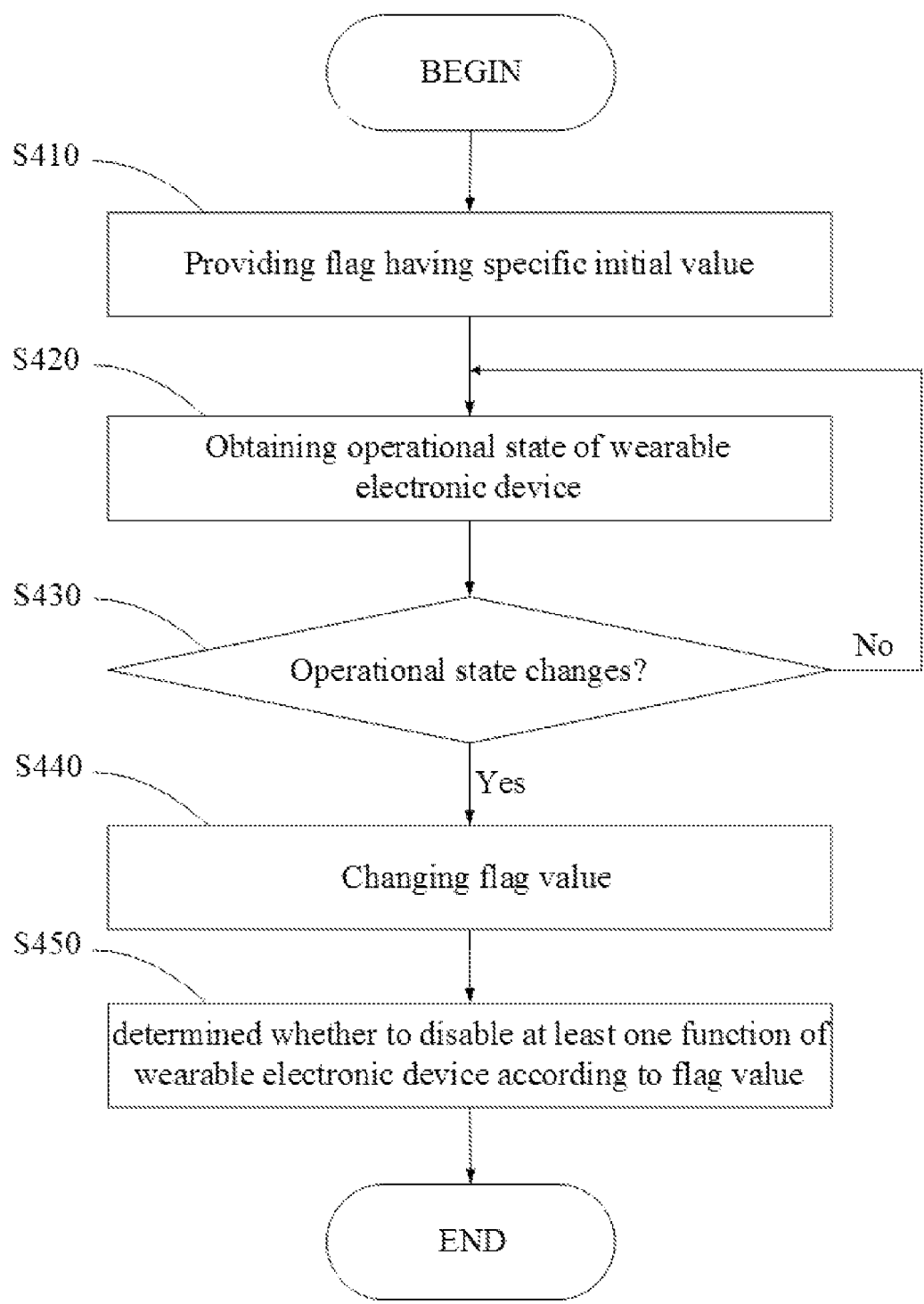
FIG. 4 is a flowchart of an embodiment of a function control method for wearable electronic devices of the invention.

FIG. 4 is a flowchart of an embodiment of a function control method for wearable electronic devices of the invention. The function control method for wearable electronic devices can be used in a wearable electronic device.

In step S410, a flag having a specific initial value is provided in the wearable electronic device. It is understood that, in some embodiments, the specific initial value can be applied with a hardware and/or software protection mechanism, such as an encryption process, thereby increasing the security of the specific initial value. It is understood that, in some embodiments, the flag 114 can be implemented using a hardware component, such as a register. In step S420, an operational state of the wearable electronic device is obtained. It is understood that, in some embodiments, the operational state of the wearable electronic device can be determined according to the manner disclosed in FIG. 2. It is noted that, the invention is not limited to any manner for determining the operational state. In step S430, it is determined whether the operational state of the wearable electronic device changes. It is understood that, in some embodiments, the determination of whether the operational state changes is performed by determining whether the operational state of the wearable electronic device changes from a closed state to an open state. When the operational state of the wearable electronic device does not change (No in step S430), the procedure returns to step S420. When the operational state of the wearable electronic device changes (Yes in step S430), in step S440, the value of the flag is changed. In some embodiments, the specific initial value of the flag can be deleted. In some embodiments, the value of the flag can be set to a specific value which is different from the specific initial value. Then, in step S450, it is determined whether to stop the execution and use of at least one function of the wearable electronic device according to the value of the flag. Similarly, the wearable electronic device may have a plurality of functions. In some embodiments, when the value of the flag is the specific initial value, all functions of the wearable electronic device can be executed. When the value of the flag does not match the specific initial value, at least one of the functions of the wearable electronic device will be disabled. It is noted that, a function is disabled means the function can be executed and used.

It is understood that, in some embodiments, the function of the wearable electronic device provides specific data in the wearable electronic device to be accessed by a specific electronic device. The specific data may be identification data, and/or electronic wallet. It is noted that, the above function is an example of the application, and the present invention is not limited thereto.

Figure 5:
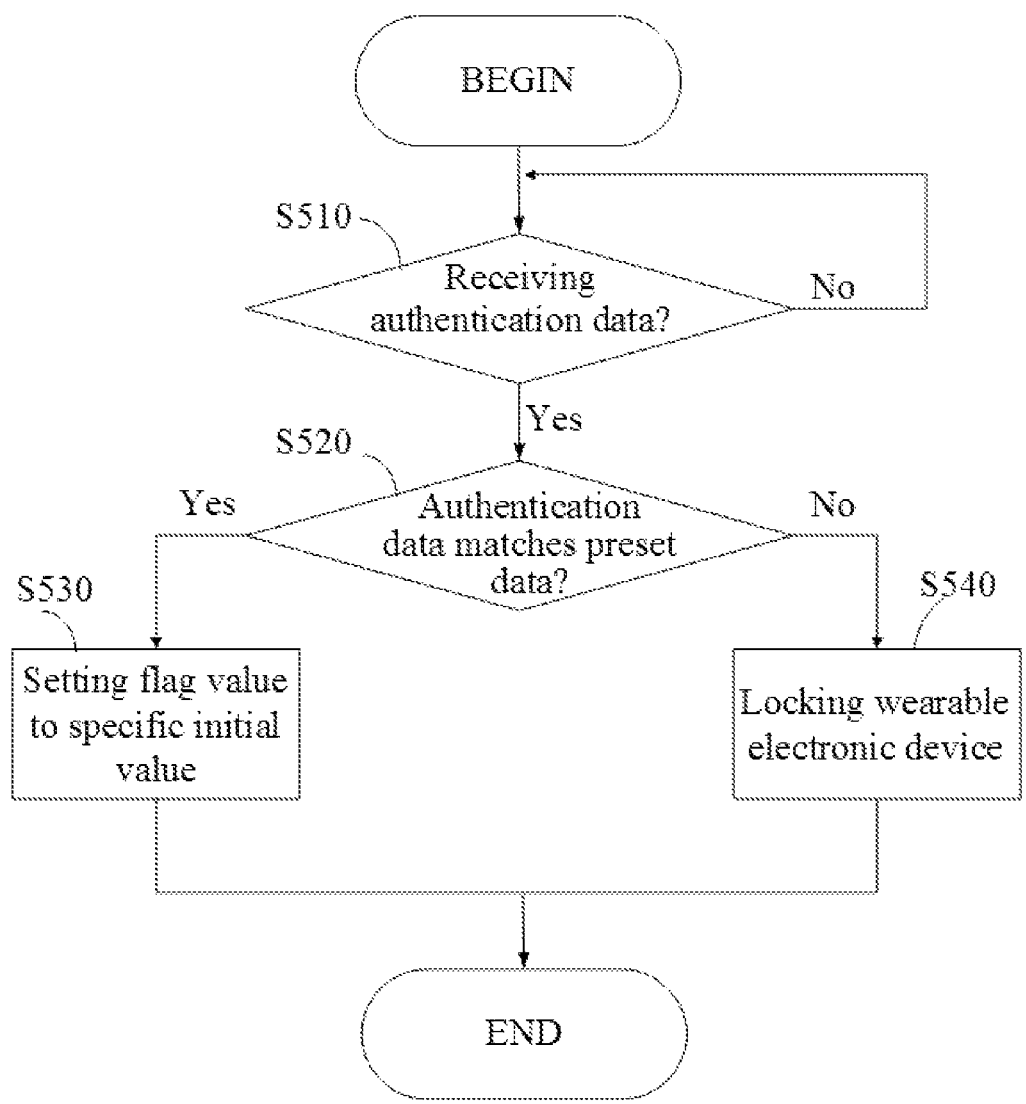
FIG. 5 is a flowchart of another embodiment of a function control method for wearable electronic devices of the invention.

FIG. 5 is a flowchart of another embodiment of a function control method for wearable electronic devices of the invention. The function control method for wearable electronic devices can be used in a wearable electronic device.

In step S510, it is determined whether authentication data is received. It is understood that, in some embodiments, when the operational state of the wearable electronic device changes, for example, when the operational state of the wearable electronic device changes from an open state (user takes off the device) to a closed state (user wears the device), a prompt for input the authentication data can be generated. It is understood that, in some embodiments, the user can input the authentication data at any time. It is noted that, in some embodiments, the authentication data may be texts, numerals, and/or a sound. In some embodiments, the wearable electronic device can comprise at least one motion sensor for detecting a motion corresponding to the wearable electronic device. The authentication data can comprise the motion. When the authentication data is not received (No in step S510), the procedure remains at step S510. It is understood that, in some embodiments, when the wearable electronic device does not receive the authentication data in a predefined interval, the wearable electronic device is locked. In some embodiments, all functions of the locked wearable electronic device cannot be executed. In some embodiments, only at least one specific function of the locked wearable electronic device can be executed. When the authentication data is received (Yes in step S510), in step S520, it is determined whether the received authentication data matches preset data in the wearable electronic device. When the received authentication data matches the preset data in the wearable electronic device (Yes in step S520), in step S530, the value of the flag of the wearable electronic device is reset to the specific initial value. When the received authentication data does not match the preset data in the wearable electronic device (No in step S520), in step S540, the wearable electronic device is locked. It is noted that, in some embodiments, when the received authentication data does not match the preset data for a specific number of times, the wearable electronic device is locked.

For example, when a user takes off a wearable electronic device, the flag value in the wearable electronic device is changed, such that at least one specific function/application of the wearable electronic device cannot be executed. In some cases, the wearable electronic device cannot be used to perform an unlocking process for a smartphone or a computer. In some cases, the wearable electronic device cannot be used to perform a mobile payment process. When the user inputs authentication data to the wearable electronic device, and the input authentication data matches the preset data in the wearable electronic device, the flag value is reset to the specific initial value, such that the user can use the wearable electronic device to perform the specific function/application. It is noted that again, the above functions/applications are examples of the application, and the present invention is not limited thereto.

Therefore, the function control methods and systems for wearable electronic devices of the present invention can set a flag value according to an operational state of a wearable electronic device, and determine whether at least one function of the wearable electronic device is allowed to be activated according to the flag value, thereby increasing the security of execution of related functions/applications on wearable electronic devices.

Function control methods for wearable electronic devices may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A function control method for wearable electronic devices for use in a wearable electronic device, comprising:
   providing a flag having a specific initial value in the wearable electronic device;
   obtaining an operational state of the wearable electronic device, wherein the wearable electronic device comprises a main body and a connecting component, when the main body does not connect with the connecting component, the operational state of the wearable electronic device is in a first operational state, and when the main body connects with the connecting component, the operational state of the wearable electronic device is in a second operational state;
   when the operational state changes, changing the value of the flag, wherein the determination of whether the operational state changes is performed by determining whether the operational state of the wearable electronic device changes from the second operational state to the first operational state, and when the value of the flag does not match the specific initial value, at least one function of the wearable electronic device is disabled;
   when the operational state changes, determining whether authentication data is received; and
   when the received authentication data matches preset data in the wearable electronic device, resetting the value of the flag to the specific initial value even if the operational state of the wearable electronic device is in the first operational state.

2. The method of claim 1, wherein the determination of whether the operational state changes is performed by determining whether a fastener of the wearable electronic device is changed from a closed state to an open state, wherein the fastener can be opened or closed to allow a user to fasten the wearable electronic device to be a loop, such that the wearable electronic device to be worn on the user.

3. The method of claim 1, further comprising a step of locking the wearable electronic device when the authentication data is not received or the received authentication data does not match the preset data in the wearable electronic device.

4. The method of claim 1, wherein the wearable electronic device comprises at least one motion sensor for detecting a motion corresponding to the wearable electronic device, and the authentication data comprises the motion.

5. The method of claim 1, wherein the function of the wearable electronic device provides specific data in the wearable electronic device to be accessed by a specific electronic device.

6. The method of claim 1, wherein the flag is implemented by a register.

7. A function control system for wearable electronic devices for use in a wearable electronic device, comprising:
   a storage unit recording an operational state of the wearable electronic device, and comprising a flag having a specific initial value, wherein the wearable electronic device comprises a main body and a connecting component, when the main body does not connect with the connecting component, the operational state of the wearable electronic device is in a first operational state, and when the main body connects with the connecting component, the operational state of the wearable electronic device is in a second operational state; and
   a processing unit obtaining the operational state of the wearable electronic device, changing the value of the flag when the operational state changes, determining whether authentication data is received when the operational state changes, and resetting the value of the flag to the specific initial value even if the operational state of the wearable electronic device is in the first operational state when the received authentication data matches preset data in the wearable electronic device,
   wherein the determination of whether the operational state changes is performed by determining whether the operational state of the wearable electronic device changes from the second operational state to the first operational state, and when the value of the flag does not match the specific initial value, at least one function of the wearable electronic device is disabled.

8. A non-transitory machine-readable storage medium comprising a computer program, which, when executed, causes a device to perform a function control method for wearable electronic devices, wherein the method comprises:
   providing a flag having a specific initial value in the wearable electronic device;
   obtaining an operational state of the wearable electronic device, wherein the wearable electronic device comprises a main body and a connecting component, when the main body does not connect with the connecting component, the operational state of the wearable electronic device is in a first operational state, and when the main body connects with the connecting component, the operational state of the wearable electronic device is in a second operational state;
   when the operational state changes, changing the value of the flag, wherein the determination of whether the operational state changes is performed by determining whether the operational state of the wearable electronic device changes from the second operational state to the first operational state, and when the value of the flag does not match the specific initial value, at least one function of the wearable electronic device is disabled;
   when the operational state changes, determining whether authentication data is received; and
   when the received authentication data matches preset data in the wearable electronic device, resetting the value of the flag to the specific initial value even if the operational state of the wearable electronic device is in the first operational state.

* * * * *